United States Patent
Kurian et al.

(10) Patent No.: US 11,949,684 B2
(45) Date of Patent: *Apr. 2, 2024

(54) SECURITY TOOL

(71) Applicant: Bank of America Corporation, Charlotte, NC (US)

(72) Inventors: Manu Jacob Kurian, Dallas, TX (US); Mahesh Bhashetty, Plainsboro, NJ (US); Anamika Singhal, Frisco, TX (US); Srinivasulu Bodapati, Telangana (IN); Balaji Subramanian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 410 days.

This patent is subject to a terminal disclaimer.

(21) Appl. No.: 17/398,776

(22) Filed: Aug. 10, 2021

(65) Prior Publication Data
US 2021/0367950 A1    Nov. 25, 2021

Related U.S. Application Data

(63) Continuation of application No. 16/552,177, filed on Aug. 27, 2019, now Pat. No. 11,122,054.

(51) Int. Cl.
*H04L 29/06* (2006.01)
*H04L 9/40* (2022.01)

(52) U.S. Cl.
CPC ........ *H04L 63/105* (2013.01); *H04L 63/0263* (2013.01); *H04L 63/1416* (2013.01); *H04L 63/1425* (2013.01); *H04L 63/1441* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 5,414,833 A | 5/1995 | Hershey et al. |
| 5,787,177 A | 7/1998 | Leppek |
| 5,828,832 A | 10/1998 | Holden et al. |
| 5,905,859 A | 5/1999 | Holloway et al. |
| 5,940,591 A | 8/1999 | Boyle et al. |
| 6,088,451 A | 7/2000 | He et al. |
| 6,304,973 B1 | 10/2001 | Williams |

(Continued)

FOREIGN PATENT DOCUMENTS

| | | |
|---|---|---|
| AU | 743258 B2 | 1/2002 |
| AU | 750858 B2 | 8/2002 |

(Continued)

*Primary Examiner* — Christopher C Harris

(57) ABSTRACT

A system includes a set of adapter interfaces, a router module, and a processor. Each adapter interface is assigned to a different level of security. The router module sends requests to the adapter interfaces, based on the security levels associated with the devices that submitted the requests. A first adapter interface establishes a first connection to the servers, providing access to a first zone. A second adapter interface establishes a second connection to the servers, providing access to a second zone. The first zone includes a set of resources assigned to the first level of security that is not included in the second zone. Each adapter interface further receives data and applies different levels of security to the data, based on the security levels associated with the devices that submitted the data.

17 Claims, 6 Drawing Sheets

(56) References Cited

U.S. PATENT DOCUMENTS

| | | |
|---|---|---|
| 6,351,817 B1 | 2/2002 | Flyntz |
| 6,389,542 B1 | 5/2002 | Flyntz |
| 7,058,970 B2 | 6/2006 | Shaw |
| 7,072,346 B2 | 7/2006 | Hama |
| 7,086,089 B2 | 8/2006 | Hrastar et al. |
| 7,136,383 B1 | 11/2006 | Wilson |
| 7,146,644 B2 | 12/2006 | Redlich et al. |
| 7,209,902 B2 | 4/2007 | Stefik et al. |
| 7,216,110 B1 | 5/2007 | Ogg et al. |
| 7,249,374 B1 | 7/2007 | Lear et al. |
| 7,353,994 B2 | 4/2008 | Farrall et al. |
| 7,359,962 B2 | 4/2008 | Willebeek-Lemair et al. |
| 7,360,087 B2 | 4/2008 | Jrgensen et al. |
| 7,398,389 B2 | 7/2008 | Teal et al. |
| 7,434,261 B2 | 10/2008 | Costea et al. |
| 7,475,137 B2 | 1/2009 | Holden et al. |
| 7,480,941 B1 | 1/2009 | Balasubramaniam et al. |
| 7,720,054 B2 | 5/2010 | Savage et al. |
| 7,735,114 B2 | 6/2010 | Kwan et al. |
| 7,831,570 B2 | 11/2010 | Sack et al. |
| 7,860,978 B2 | 12/2010 | Oba et al. |
| 7,903,553 B2 | 3/2011 | Liu |
| 8,020,211 B2 | 9/2011 | Keanini et al. |
| 8,027,927 B2 | 9/2011 | Ogg et al. |
| 8,046,835 B2 | 10/2011 | Herz |
| 8,194,535 B2 | 6/2012 | Kodialam et al. |
| 8,302,205 B2 | 10/2012 | Kanai |
| 8,307,422 B2 | 11/2012 | Varadhan et al. |
| 8,316,435 B1 | 11/2012 | Varadhan et al. |
| 8,327,442 B2 | 12/2012 | Herz et al. |
| 8,339,959 B1 | 12/2012 | Moisand et al. |
| 8,561,139 B2 | 10/2013 | Singhal |
| 8,745,565 B2 | 6/2014 | Gao |
| 8,776,040 B2 | 7/2014 | Chalmers et al. |
| 8,856,771 B2 | 10/2014 | Chalmers et al. |
| 9,077,746 B2 | 7/2015 | Chandrashekhar et al. |
| 9,130,937 B1 | 9/2015 | Ostermann et al. |
| 9,215,244 B2 | 12/2015 | Ayyagari et al. |
| 9,536,077 B2 | 1/2017 | Bignon et al. |
| 9,734,169 B2 | 8/2017 | Redlich et al. |
| 10,079,836 B2 | 9/2018 | Klein et al. |
| 10,116,634 B2 | 10/2018 | Golshan et al. |
| 10,177,977 B1 | 1/2019 | Avramov et al. |
| 10,552,590 B2 | 2/2020 | Hamlin et al. |
| 10,958,662 B1 | 3/2021 | Sole et al. |
| 2004/0123153 A1 | 6/2004 | Wright et al. |
| 2017/0141926 A1 | 5/2017 | Xu et al. |
| 2019/0058714 A1 | 2/2019 | Joshi et al. |
| 2019/0102551 A1 | 4/2019 | Zimmermann et al. |
| 2020/0213358 A1 | 7/2020 | Helfinstine et al. |
| 2021/0067519 A1 | 3/2021 | Kurian et al. |

FOREIGN PATENT DOCUMENTS

| | | |
|---|---|---|
| CA | 2222341 C | 8/2001 |
| CA | 2211301 C | 1/2006 |
| EP | 1470526 B1 | 2/2006 |
| EP | 1158725 B1 | 8/2008 |
| EP | 1095493 B1 | 4/2016 |
| EP | 2555486 B1 | 11/2018 |

US 11,949,684 B2

SECURITY TOOL

CROSS-REFERENCE TO RELATED APPLICATIONS

This application is a continuation of U.S. patent application Ser. No. 16/552,177 filed Aug. 27, 2019, by Manu Jacob Kurian et al., and entitled "SECURITY TOOL," which is incorporated herein by reference.

TECHNICAL FIELD

This invention relates generally to network security, and specifically to a security tool.

BACKGROUND

With the recent proliferation of mobile device technology, the rise in cloud computing, and the popularity of work-from-home policies, many organizations have adopted technology policies permitting the use of personal computing devices to access internal company servers, rather than restricting access to company-issued devices. These policies provide users with the flexibility to choose their preferred access devices as well as the ability to access the internal servers from any location, at any time, potentially increasing both user productivity and user satisfaction.

At the same time, such policies also bring with them increased network security risks. While traditional network security solutions, such as firewalls, anti-virus software, anti-spyware, security patch management, and virtual private networks continue to play a vital role in network protection, they may not be effective against a personal device with out-of-date security standard that is able to connect to an organization's internal servers, potentially exposing the servers to mal-ware or other security threats.

SUMMARY

With the recent proliferation of mobile device technology, the rise in cloud computing, and the popularity of work-from-home policies, many organizations have adopted technology policies permitting the use of personal computing devices to access internal company servers, rather than restricting access to company-issued devices. These policies provide users with the flexibility to choose their preferred access devices as well as the ability to access internal company servers from any location, at any time, potentially increasing both user productivity and user satisfaction.

At the same time, such policies also bring with them increased network security risks. While traditional network security solutions, such as firewalls, anti-virus software, anti-spyware, security patch management, and virtual private networks continue to play a vital role in network protection, they may not be effective against a personal device with out-of-date security standard that is able to connect to an organization's internal servers, potentially exposing the servers to mal-ware or other security threats.

One possible solution to this problem is for organizations to restrict internal server access to only those personal devices with up-to-date security standards. However, this may be undesirable for multiple reasons: (1) many user devices may not be able to support the latest security standards; and (2) user satisfaction may decrease, if users find themselves unable to access an organization's internal servers each time the organization upgrades its security standards.

This disclosure contemplates a security tool that addresses one or more of the above issues. The tool is designed to sit at the edge between an external network and an organization's internal servers. When a device seeks access to the organization's internal servers, a router module of the security tool intercepts the associated connection request, sent by the device to the internal servers. The router module then uses the connection request to determine the security standards of the device, without yet providing the device any access to the internal servers. In this manner, the security tool helps to protect the internal servers from security vulnerabilities that may be associated with a device seeking to connect with the internal servers, while the tool assesses the security level associated with the device. After determining the security level of the device, the router module may then route the connection request to one of a plurality of adapter modules, each module associated with a given level of security. For example, a first adapter module may be associated with up-to-date security standards offering the highest level of security, a second adapter module may be associated with security standards offering a medium level of security, and a third adapter module may be associated with legacy standards offering the lowest level of security. Each router module is designed to establish a connection between a device and an organization's internal servers, where the level of access provided by the connection depends on the security level assigned to the adapter module. For example, the connection established by the first adapter module, associated with the highest level of security, may provide a device with access to a first zone of the internal servers, which includes a first set of resources assigned to the highest level of security, the connection established by the second adapter module, associated with a medium level of security, may provide a device with access to a second zone of the internal servers, which does not include the first set of resources, and the connection established by the third adapter module, associated with the lowest level of security, may provide a device with access to a third zone of the internal servers, which does not include the first set or the second set of resources, potentially limiting access to a quarantine location in the internal servers. The tool additionally applies different security measures to incoming data sent to the internal servers, based on the security levels of the devices sending the data. In this manner, certain embodiments help to protect an internal server system from security vulnerabilities arising when devices which have yet to upgrade to the latest security standards access the system, while nevertheless providing such devices with some access to the system. Certain embodiments of the security tool are described below.

According to one embodiment, a system includes a router module, a first adapter interface, a second adapter interface, a third adapter interface, and a hardware processor configured to implement the router module, first adapter interface, the second adapter interface, and the third adapter interface. The first adapter interface is assigned to a first level of security. The second adapter interface is assigned to a second level of security lower than the first level of security. The third adapter interface is assigned to a third level of security lower than the second level of security. The router module receives a first request. The first request includes first security metadata. The first request indicates that a first device is seeking a first connection with one or more servers. The router module also determines, based on the first security metadata and without connecting the first device to the one or more servers, that the first device is associated with the first level of security. In response to determining that the first device is associated with the first level of security, the router module sends the first request to the first adapter interface. The router module additionally receives a second request. The second request includes second security metadata. The second request indicates that a second device is seeking a second connection with the one or more servers. The router module also determines, based on the second security metadata and without connecting the second device to the one or more servers, that the second device is associated with the second level of security. In response to determining that the second device is associated with the second level of security, the router module sends the second request to the second adapter interface. The router module additionally receives a third request. The third request includes third security metadata. The third request indicates that a third device is seeking a third connection with the one or more servers. The router module also determines, based on the third security metadata and without connecting the third device to the one or more servers, that the third device is associated with the third level of security. In response to determining that the third device is associated with the third level of security, the router module sends the third request to the third adapter interface. The first adapter interface receives the first request from the router module. The first adapter interface also establishes the first connection between the first device and the one or more servers. The first connection provides the first device with access to a first zone of the one or more servers. The first zone includes a first set of resources assigned to the first level of security. The first adapter interface additionally receives first data from the first device. The first adapter interface further applies first security measures to the first data. The second adapter interface receives the second request from the router module. The second adapter interface also establishes the second connection between the second device and the one or more servers. The second connection provides the second device with access to a second zone of the one or more servers. The second zone excludes the first set of resources and includes a second set of resources assigned to the second level of security. The second adapter interface additionally receives second data from the second device. The second adapter interface further applies second security measures to the second data. The second security measures are stronger than the first security measures. The third adapter interface receives the third request from the router module. The third adapter interface also establishes the third connection between the third device and the one or more servers. The third connection provides the third device with access to a quarantine in the one or more servers. The third adapter interface additionally applies third security measures. The third security measures are stronger than the second security measures.

According to another embodiment, a method includes using a router module to receive a first request. The first request includes first security metadata and indicates that a first device is seeking a first connection with one or more servers. The method also includes determining, based on the first security metadata and without connecting the first device to the one or more servers, that the first device is associated with a first level of security. In response to determining that the first device is associated with the first level of security, the method includes sending the first request to a first adapter interface assigned to a first level of security. The method additionally includes using the first adapter interface to receive the first request. The method further includes using the first adapter interface to establish the first connection between the first device and the one or more servers. The first connection provides the first device with access to a first zone of the one or more servers. The first zone includes a first set of resources assigned to the first level of security. The method also includes using the first adapter to receive first data from the first device. The method additionally includes using the first adapter interface to apply first security measures to the first data. The method further includes using the router module to receive a second request. The second request includes second security metadata and indicates that a second device is seeking a second connection with the one or more servers. The method also includes determining, based on the second security metadata and without connecting the second device to the one or more servers, that the second device is associated with a second level of security lower than the first level of security. In response to determining that the second device is associated with the second level of security, the method includes sending the second request to a second adapter interface assigned to the second level of security. The method additionally includes using the second adapter interface to receive the second request. The method further includes using the second adapter interface to establish the second connection between the second device and the one or more servers. The second connection provides the second device with access to a second zone of the one or more servers. The second zone excludes the first set of resources and includes a second set of resources assigned to the second level of security. The method also includes using the second adapter interface to receive second data from the second device. The method additionally includes using the second adapter interface to apply second security measures to the second data. The second security measures are stronger than the first security measures. The method further includes using the router module to receive a third request. The third request includes third security metadata and indicates that a third device is seeking a third connection with the one or more servers. The method also includes determining, based on the third security metadata and without connecting the third device to the one or more servers, that the third device is associated with a third level of security lower than the second level of security. In response to determining that the third device is associated with the third level of security, the method includes sending the third request to a third adapter interface assigned to the third level of security. The method additionally includes using the third adapter interface to receive the third request. The method further includes using the third adapter interface to establish the third connection between the third device and the one or more servers. The third connection provides the third device with access to a quarantine. The method also includes using the third adapter interface to receive third data from the third device. The method additionally includes using the third adapter interface to apply third security measures to the third data. The third security measures are stronger than the second security measures.

According to a further embodiment, a system includes one or more servers, a router module, a first adapter interface, a second adapter interface, a third adapter interface, and a processing element operable to implement the router module, the first adapter interface, the second adapter interface, and the third adapter interface. The first adapter interface is assigned to a first level of security. The second adapter interface is assigned to a second level of security lower than the first level of security. The third adapter interface is assigned to a third level of security lower than the second level of security. The router module receives a first request. The first request includes first security metadata. The first request indicates that a first device is seeking a first connection with one or more servers. The router module also determines, based on the first security metadata and without connecting the first device to the one or more servers, that the first device is associated with the first level of security. In response to determining that the first device is associated with the first level of security, the router module sends the first request to the first adapter interface. The router module additionally receives a second request. The second request includes second security metadata. The second request indicates that a second device is seeking a second connection with the one or more servers. The router module also determines, based on the second security metadata and without connecting the second device to the one or more servers, that the second device is associated with the second level of security. In response to determining that the second device is associated with the second level of security, the router module sends the second request to the second adapter interface. The router module additionally receives a third request. The third request includes third security metadata. The third request indicates that a third device is seeking a third connection with the one or more servers. The router module also determines, based on the third security metadata and without connecting the third device to the one or more servers, that the third device is associated with the third level of security. In response to determining that the third device is associated with the third level of security, the router module sends the third request to the third adapter interface. The first adapter interface receives the first request from the router module. The first adapter interface also establishes the first connection between the first device and the one or more servers. The first connection provides the first device with access to a first zone of the one or more servers. The first zone includes a first set of resources assigned to the first level of security. The first adapter interface additionally receives first data from the first device. The first adapter interface further applies first security measures to the first data. Applying the first security measures to the first data includes applying a scan to a first portion of the first data. The second adapter interface receives the second request from the router module. The second adapter interface also stablishes the second connection between the second device and the one or more servers. The second connection provides the second device with access to a second zone of the one or more servers. The second zone excludes the first set of resources and includes a second set of resources assigned to the second level of security. The second adapter interface additionally receives second data from the second device. The second adapter interface further applies second security measures to the second data. The second security measures are stronger than the first security measures. Applying the second security measures to the second data includes applying the scan to a second portion of the second data. The second portion is greater than the first portion. The third adapter interface receives the third request from the router module. The third adapter interface also establishes the third connection between the third device and the one or more servers. The third connection provides the third device with access to a quarantine in the one or more servers. The third adapter interface additionally applies third security measures. The third security measures are stronger than the second security measures. Applying the third security measures to the third data includes applying the scan to a third portion of the third data. The third portion is greater than the second portion.

Certain embodiments provide one or more technical advantages. For example, an embodiment improves the security of an internal server system in which users are permitted to access the system using devices which may not have up-to-date security standards. As another example, an embodiment provides devices with continued access to a server system after the system has upgraded to higher security standards, even if the devices themselves have not upgraded to these higher standards. In such embodiments, the tool may provide the devices with access to different zones of the server system assigned to lower levels of security (as compared to zones of the server system that the devices were permitted to access before the server system was upgraded). In this manner, such embodiments may help to protect sensitive areas of the server system from threats associated with the lower security devices, without simply refusing connection requests from these devices. As another example, an embodiment conserves system resources, by tailoring the amount of security scanning performed on data submitted to the system, based on the security standards of the devices submitting the data. As a further example, an embodiment helps prevent hackers from detecting vulnerable devices by providing such devices with access to a quarantine location in the server system, rather than simply rejecting connection requests submitted by the devices. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
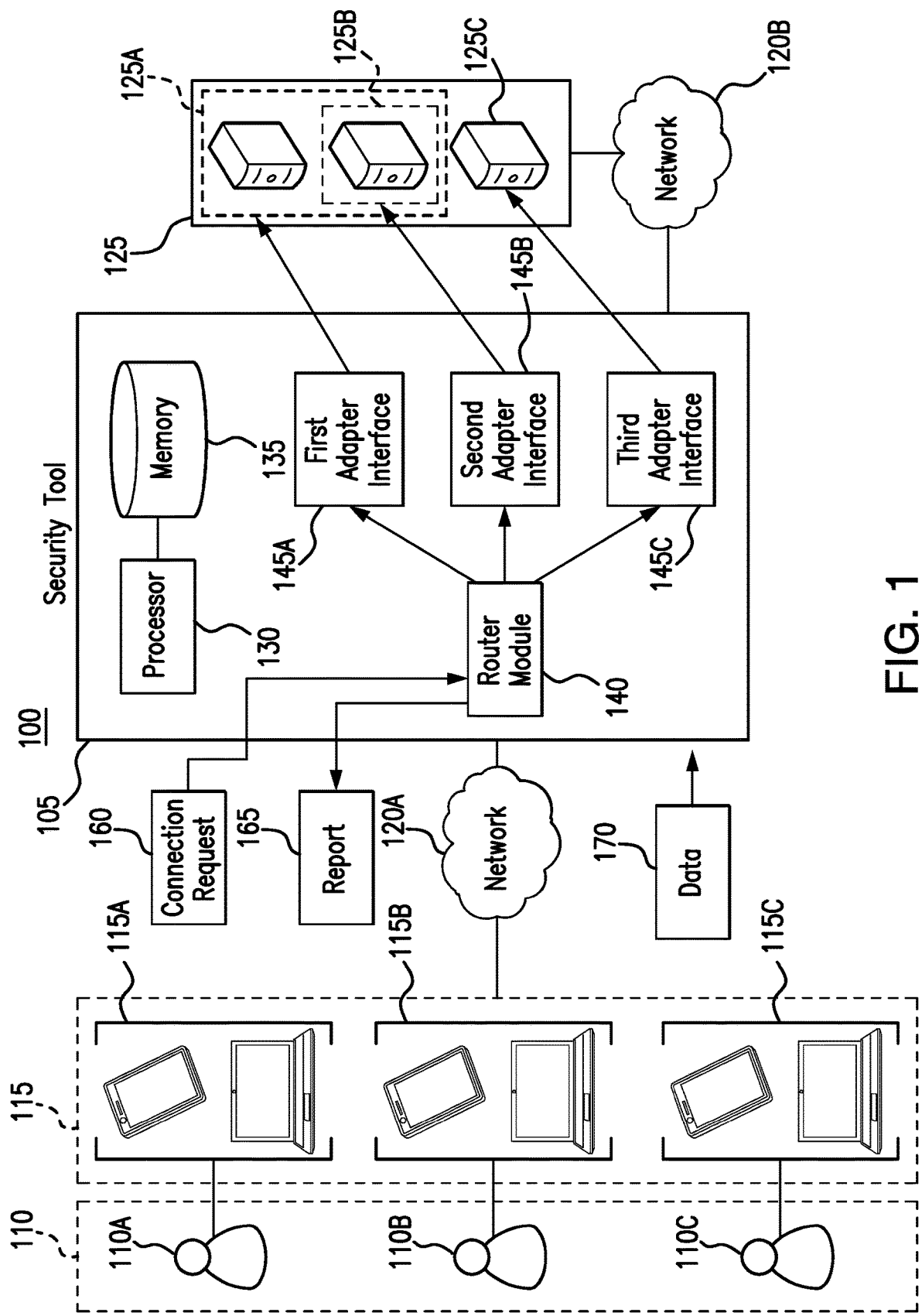
FIG. 1 illustrates an example system.
Figure 2A:
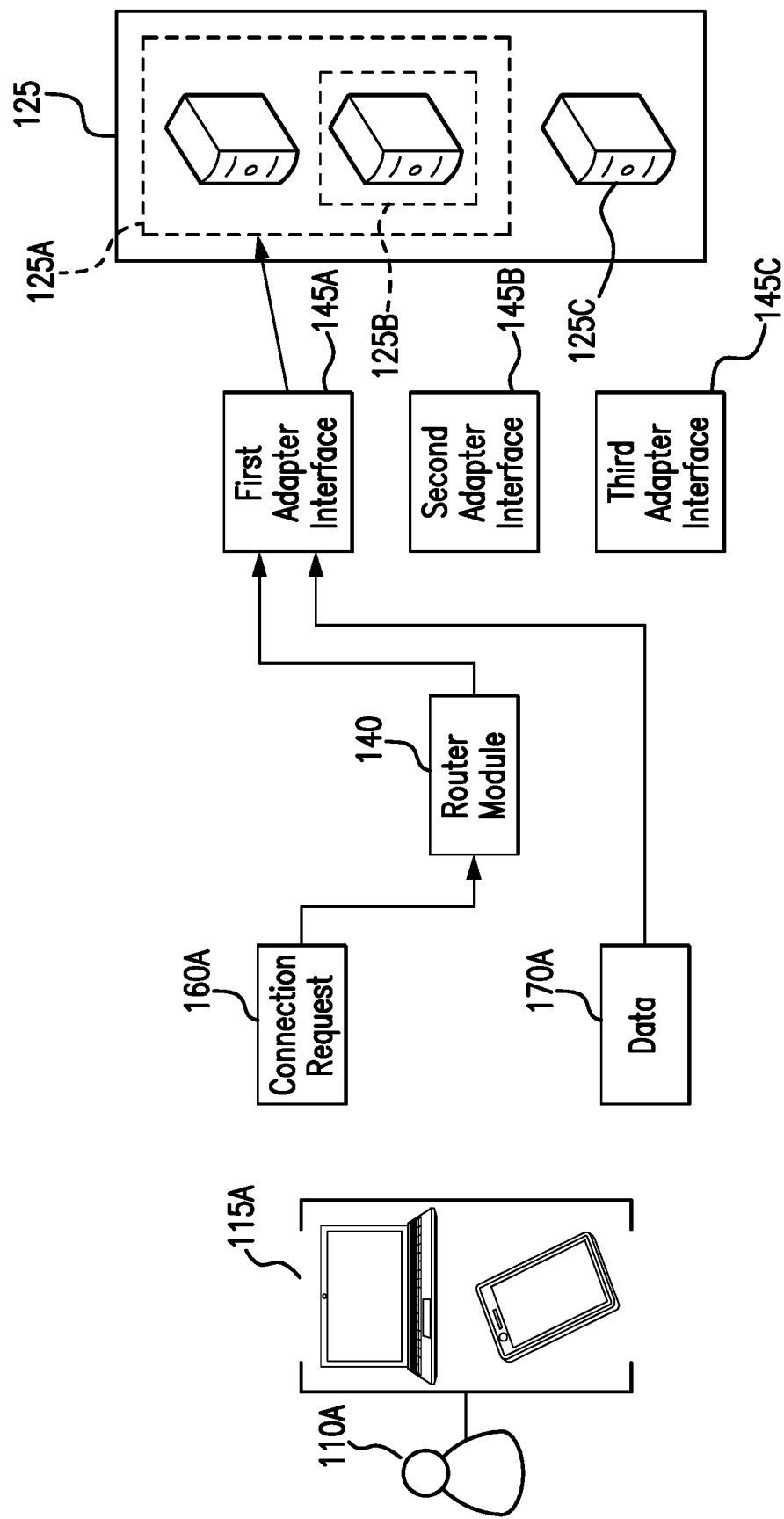
FIGS. 2A through 2D illustrate examples of the behavior of the router module and adapter interfaces of the security tool in the system of FIG. 1, in response to receiving connection requests associated with various levels of security.
Figure 2B:
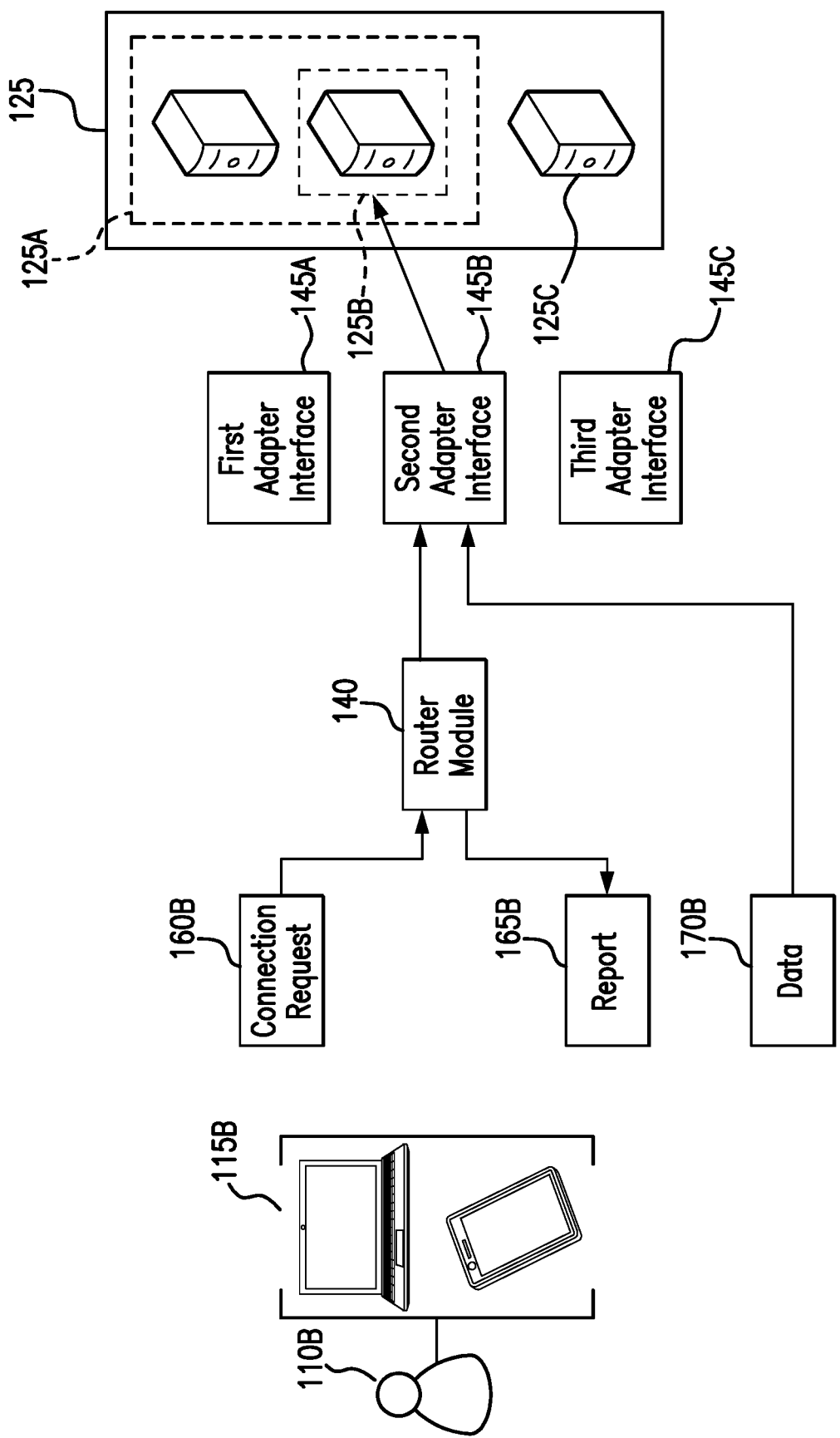
Figure 2C:
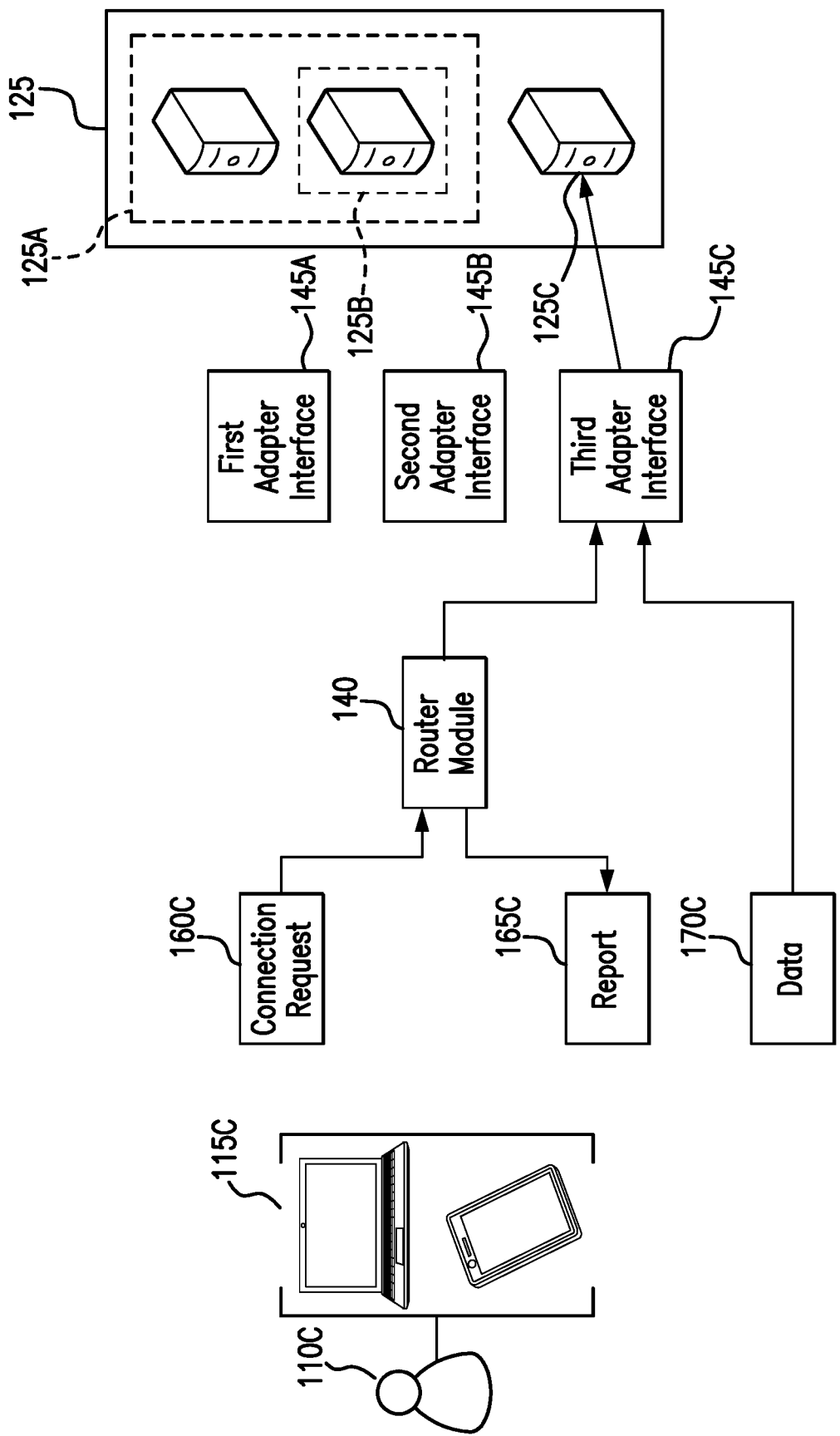
Figure 2D:
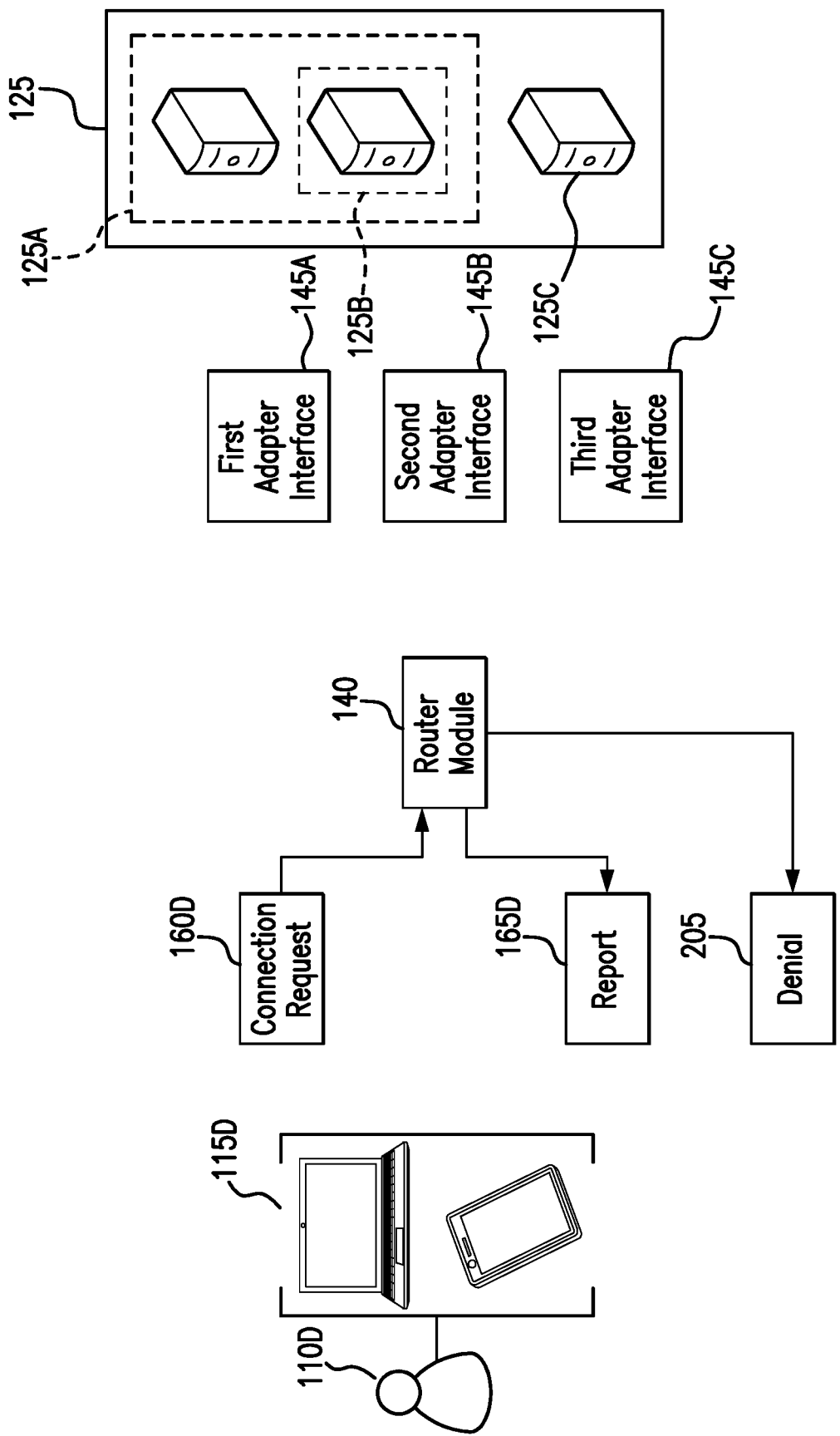
Figure 3:
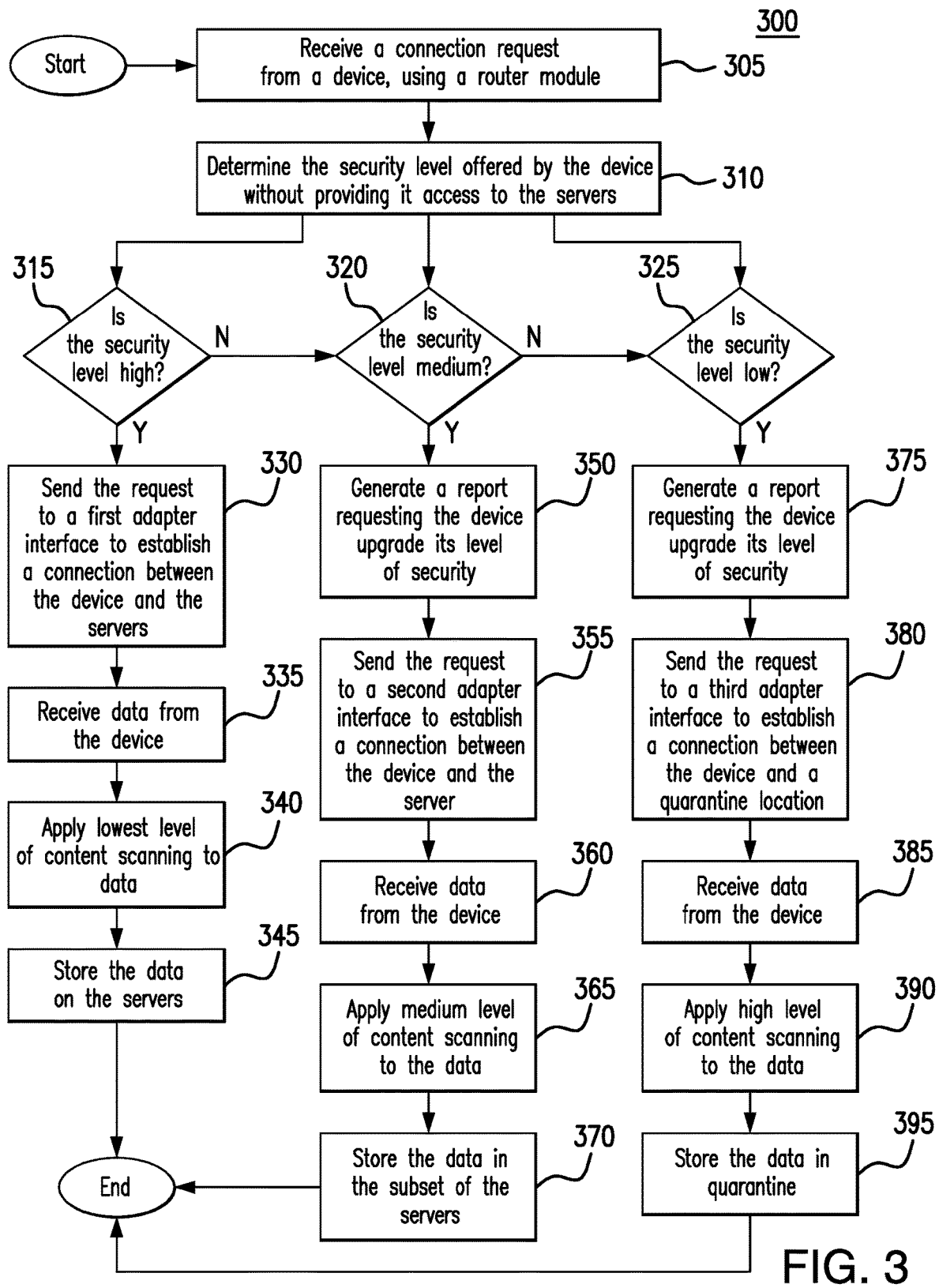
FIG. 3 presents a flowchart illustrating the process by which the security tool of the system in FIG. 1 determines the level of access to provide a device seeking a connection to a system of internal servers, based on the security level of the device.

Embodiments of the present disclosure and its advantages may be understood by referring to FIGS. 1 through 3 of the drawings, like numerals being used for like and corresponding parts of the various drawings.

With the recent proliferation of mobile device technology, the rise in cloud computing, and the popularity of work-from-home policies, many organizations have adopted technology policies permitting the use of personal computing devices to access internal company servers, rather than restricting access to company-issued devices. These policies provide users with the flexibility to choose their preferred access devices as well as the ability to access internal company servers from any location, at any time, potentially increasing both user productivity and user satisfaction.

At the same time, such policies also bring with them increased network security risks. While traditional network security solutions, such as firewalls, anti-virus software, anti-spyware, security patch management, and virtual private networks continue to play a vital role in network protection, they may not be effective against a personal device with out-of-date security standard that is able to connect to an organization's internal servers, potentially exposing the servers to mal-ware or other security threats.

One possible solution to this problem is for organizations to restrict internal server access to only those personal devices with up-to-date security standards. However, this may be undesirable for multiple reasons: (1) many user devices may not be able to support the latest security standards; and (2) user satisfaction may decrease, if users find themselves unable to access an organization's internal servers each time the organization upgrades its security standards.

This disclosure contemplates a security tool that addresses one or more of the above issues. The tool is designed to sit at the edge between an external network and an organization's internal servers. When a device seeks access to the organization's internal servers, a router module of the security tool intercepts the associated connection request, sent by the device to the internal servers. The router module then uses the connection request to determine the security standards of the device, without providing the device any access to the internal servers. In this manner, the security tool helps to protect the internal servers from security vulnerabilities that may be associated with a device seeking to connect with the internal servers, while the tool assesses the security level associated with the device.

After determining the security level of the device, the router module may then route the connection request to one of a plurality of adapter modules, each module associated with a given level of security. For example, a first adapter module may be associated with up-to-date security standards offering the highest level of security, a second adapter module may be associated with security standards offering a medium level of security, and a third adapter module may be associated with legacy standards offering the lowest level of security. Each router module is designed to establish a connection between a device and an organization's internal servers, where the level of access provided by the connection depends on the security level assigned to the adapter module. For example, the connection established by the first adapter module, associated with the highest level of security, may provide a device with access to a first zone of locations in the internal servers, including a first set of resources assigned to the highest level of security, the connection established by the second adapter module, associated with a medium level of security, may provide a device with access to a second zone of locations in the internal servers, excluding the first set of resources and including a second set of resources assigned to the medium level of security, and the connection established by the third adapter module, associated with the lowest level of security, may provide a device with access to a third zone of locations in the internal servers, excluding the first set of resources and the second set of resources, and potentially limiting the access of the device to a quarantine location in the internal servers. The tool additionally applies different security measures to incoming data sent to the internal servers, based on the security levels of the devices sending the data. In this manner, certain embodiments help to protect an internal server system from security vulnerabilities arising when devices which have yet to upgrade to the latest security standards access the system, while nevertheless providing such devices with some access to the system. The security tool will be described in more detail using FIGS. 1 through 3.

FIG. 1 illustrates an example system 100. As seen in FIG. 1, system 100 includes security tool 105, users 110, devices 115, network 120A, network 120B, and servers 125. Generally, security tool 105 receives connection requests 150 from devices 115 seeking access to servers 125. For each connection request 150, security tool 105 uses router module 140 to determine the security level associated with the device 115 that submitted the request (e.g. device 115A), without first establishing a connection between the device 115 and servers 125. Router module 140 then routes each connection request 150 to one of adapter interfaces 145A through 145C, based on the determined security level of device 115. Each adapter interface 145 is configured to receive such connection requests from router module 140 and to establish a connection between a device 115 and a zone 125A through 125C of servers 125, where the resources included in each zone 125A through 125C depends on the security level associated with the particular device 115 that sent the connection request 150. For example, in certain embodiments, security tool 105 contains three adapter interfaces—first adapter interface 145A, assigned to the highest level of security, second adapter interface 145B assigned to a medium level of security, and third adapter interface 145C, assigned to the lowest level of security. If router module 140 determines that device 115A is associated with a high level of security, router module 140 may send connection request 150 to first adapter interface 145A, which may then establish a connection between device 115A and first zone 125A, where first zone 125A includes resources assigned to the high level of security. If router module 140 determines that device 115A is associated with a medium level of security, router module 140 may instead send connection request 150 to second adapter interface 145B, which may then establish a connection between device 115A and second zone 125B, where second zone 125B excludes resources assigned to the high level of security and includes resources assigned to the medium level of security. Alternatively, if router module 140 determines that device 115A is associated with a low level of security, router module 140 may send connection request 150 to third adapter interface 145C, which may then establish a connection between device 115A and third zone 125C. In certain embodiments, third zone 125 may comprise a quarantine location. Once security tool 105 has established connections between devices 115 and servers 125, security tool 105 additionally applies different levels of security measures/scrutiny to incoming data submitted by devices 115, based on the determined security levels of each of devices 115.

Devices 115 may be used by users 110 to send connection requests 150 to security tool 105, seeking access to internal servers 125. Devices 115 may also be used by users 110 to send data 160 to internal servers 125, once connections with servers 125 have been established. In certain embodiments, devices 115 may additionally be used to receive reports 155 generated by security tool 105. In certain such embodiments, reports 155 may be sent to devices 115 that do not contain up-to-date security standards. Such reports 155 may include requests for devices 115 to upgrade to higher-level security standards. In certain embodiments, reports 155 may contain download links for higher-level security standards and/or instructions on how to download higher-level security standards. In some embodiments, a report 150 may indicate that security tool 105 will only provide device 115 with access to servers 125 for a limited grace period, after which security tool 105 will reject any further connection requests 150, if a user 110 of device 115 does not update the security standards of device 115 before the grace period expires. This disclosure contemplates that the limited grace period may be any period of time. For example, the grace period may correspond to a number of days, weeks, or months.

Devices 115 include any appropriate device for communicating with components of system 100 over network 120A. For example, devices 115 may be a telephone, a mobile phone, a computer, a laptop, a wireless or cellular telephone, a tablet, a server and/or an automated assistant, among others. This disclosure contemplates devices 115 being any appropriate device for sending and receiving communications over network 120A. Device 115 may also include a user interface, such as a display, a microphone, keypad, or other appropriate terminal equipment usable by user 110A, 110B, or 110C. In some embodiments, an application executed by device 115 may perform the functions described herein.

Network 120A facilitates communication between and amongst the various components of system 100 located outside of internal network 120B of servers 125. This disclosure contemplates network 120A being any suitable network operable to facilitate communication between such components of system 100. Network 120A may include any interconnecting system capable of transmitting audio, video, signals, data, messages, or any combination of the preceding. Network 120A may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Network 120B facilitates communication between and amongst the various components of security tool 105 and internal servers 125. This disclosure contemplates network 120B being any suitable network operable to facilitate communication between the components of security tool 105 and servers 125. Network 120B may include any interconnecting system capable of transmitting audio, video, signals, data, messages, or any combination of the preceding. Network 120B may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Servers 125 may be located on, or otherwise connected to, internal network 120B. Servers 125 may be used to run projects and process requests submitted by users 110. Servers 125 may include application servers, database servers, file servers, mail servers, print servers, web servers, or any other type of server that provides computational functionality to users 110. A project submitted to servers 125 may use one or more servers 125 when executing. When a project uses more than one server 125, communication between those servers used by the project occurs over network 120B. The computational capacity of a given server 125 depends both on its hardware and software specifications.

As illustrated in FIG. 1, servers 125 may be divided into various zones 125A through 125C, with each zone assigned to a given adapter interface 145. For example, as illustrated in FIG. 1, first adapter interface 145A may be assigned to first zone 125A, second adapter interface 145B may be assigned to second zone 125B, and third adapter interface 145C may be assigned to third zone 125C. This disclosure contemplates that servers 125 may be divided into any number of zones 125A through 125C, in any manner. For example, a given zone 125A may include a single server, multiple servers, a subset of locations in a single server, and/or multiple subsets of locations in multiple servers. Furthermore, this disclosure contemplates that zones 125A through 125C may be nested. For example, zone 125A, associated with the highest level of security, may include all of the other zones 125B and 125C associated with lower levels of security. Similarly, zone 125B, associated with the second highest level of security may contain zone 125C, associated with of the lowest level of security, but may not include zone 125A, associated with the highest level of security. In certain embodiments, zone 125A, associated with the highest level of security, may encompass all of servers 125. In certain other embodiments, some locations in servers 125 may be inaccessible even to those users 110 whose devices 115 contain the highest levels of security. For example, some locations in servers 125 may only be accessible by devices located on network 120B.

In certain embodiments, servers 125 may include a quarantine location. For example, in certain embodiments third zone 125C may correspond to a quarantine location. In certain such embodiments, devices 115 associated with the lowest levels of security that are still permitted access to servers 125 may only be provided with access to quarantine location (third zone) 125C. This disclosure contemplates that quarantine location 125C may be isolated from the remainder of servers 125, such that any viruses and/or mal-ware deposited in quarantine location 125C from infected devices 115 may be unable to spread to the remainder of servers 125.

As seen in FIG. 1, security tool 105 includes a processor 130 and a memory 135. This disclosure contemplates processor 130 and memory 135 being configured to perform any of the functions of security tool 105 described herein. Generally, security tool 105 implements router module 140 and adapter interfaces 145A through 145C.

Router module 140 receives connection requests 150 submitted by devices 115 seeking access to servers 125. This disclosure contemplates that security tool 105 (and accordingly router module 140) is separate from servers 125, such that router module 140 may determine the security level associated with a device 115A, without device 115A yet connecting to servers 125. This is in contrast to conventional systems, in which a device seeking access to a server exchanges security information ultimately with that server, during the handshake process. In such situations, even though the server may reject a connection request from a device associated with a low level of security, the initial message exchange between the device and the server may nevertheless expose the server to security vulnerabilities. Accordingly, by determining the security level associated with a given device 115A without allowing device 115A to communicate directly with servers 125, certain embodiments of security tool 105 may provide servers 125 with an extra level of security protection, as compared to conventional systems.

This disclosure contemplates that router module 140 may determine the security levels associated with a given device 115A in any suitable manner. For example, in certain embodiments, connection request 150 may contain security metadata from which router module 140 may determine the associated security level. In some embodiments, router module 140 may generate a virtual zone, and attempt to perform a "virtual" handshake between device 115A and the virtual zone. Router module 140 may first attempt to perform the virtual handshake with device 115A using the highest level of security standards, and then progressively decrease the security level each time the virtual handshake fails, until a set of security standards are chosen for which the virtual handshake succeeds.

Once router module 140 has determined the level of security associated with device 115A, router module 140 may next route connection request 150 received from device 115A to one of adapter interfaces 145A through 145C, to establish a connection with servers 125. This disclosure contemplates that each of adapter interfaces 145A through 145C is assigned to a given level of security, or a given range of levels of security. As illustrated in FIG. 1, first adapter interface 145A is assigned to the highest levels of security and provides access to first zone 125A, which includes a set of resources of servers 125 assigned to the highest levels of security, second adapter interface 145B is assigned to medium levels of security and provides access to second zone 125B, which excludes the set of resources assigned to the highest levels of security and includes a set of resources assigned to the medium levels of security, and third adapter interface 145C is assigned to low levels of security and provides access to third zone 125C, which excludes the set of resources assigned to the highest levels of security and the set of resources assigned to the medium levels of security, and may include a quarantine location in servers 125. While depicted in FIG. 1 as including three adapter interfaces 145A through 145C, this disclosure contemplates that security tool 105 may include any number of adapter interfaces 145A through 145C.

Tables 1 and 2 present examples of various security standards that may be assigned to adapter interfaces 145A through 145C:

TABLE 1

| Cipher Suite | Key Management | Symmetric Algorithm | Hash | Adapter Interface |
|---|---|---|---|---|
| TLS_RSA_WITH_AES_256_GCM_SHA384 | RSA | AES | SHA-384 | First Adapter Interface 145A |
| TLS_RSA_WITH_AES_128_GCN_SHA256 | RSA | AES | SHA-256 | First Adapter Interface 145A |
| TLS_DH_RSA_WITH_AES_256_GCM_SHA384 | DH | AES256 | SHA-384 | Second Adapter Interface 145B |
| TLS_RSA_WITH_RC4_128_MD5 | RSA | RC4 | MD5 | Third Adapter Interface 145C |

TABLE 2

| SSL/TLS Version | Adapter Interface |
|---|---|
| TLS 1.3 | First Adapter Interface 145A |
| TLS 1.2 | Second Adapter Interface 145B |
| TLS 1.1 | Third Adapter Interface 145C |
| TLS 1.0 | Third Adapter Interface 145C |

While Tables 1 and 2 provide specific examples of security standards assigned to adapter interfaces 145A through 145C, this disclosure contemplates that any appropriate security standards may be assigned to adapter interfaces 145A through 145C. Additionally, given that security standards are constantly evolving, this disclosure contemplates that the security standards that may be associated with adapter interfaces 145A through 145C will likely change over time, as higher security standards are developed, and current security standards are downgraded.

In certain embodiments, memory 135 may contain one or more tables similar to Tables 1 and 2, assigning given security standards to adapter interfaces 145A through 145C. Accordingly, once router module 140 determines the security standards associated with a given device 115, router module 140 may consult memory 135 to determine which adapter interface 145A through 145C (if any) is assigned to the security standards associated with device 115, and accordingly, to which adapter interface 145A through 145C to send connection request 150.

In certain embodiments, if router module 140 determines that a device 115 is not associated with the highest level of security, router module 140 may send a report 155 to device 115, instructing user 110 to upgrade device 115 to a higher security level. In some embodiments, report 155 may contain one or more download links through which user 110 may upgrade to higher-level security standards and/or instructions on how to download higher-level security standards.

In certain embodiments, router module 140 may determine that a device 115 is associated with a lower level of security than the lowest level of security assigned to any of adapter interfaces 145A through 145C. In certain such embodiments, rather than routing connection request 150 to one of adapter interfaces 145A through 145C, router module 140 may deny connection request 150. In other such embodiments, instead of denying connection request 150, router module 135 may indicate through report 150 that security tool 105 will provide device 115 with access to servers 125, but only for a limited grace period during which time user 110 should upgrade the security standards associated with device 115. Report 155 may further indicate that if user 110 does not upgrade the security standards associated with device 115 during this grace period, security tool 105 will reject any further connection requests 150 from device 115. This disclosure contemplates that the grace period may be any period of time. For example, the grace period may correspond to a number of days, weeks, or months.

In embodiments in which report 150 may indicate that security tool 105 will only provide device 115 with access to servers 125 for a limited grace period, router module 140 may additionally store a record of report 150 in memory 135 to track this grace period. In such embodiments, when router module 140 receives subsequent connection requests 150 from device 115, router module 140 may first determine whether device 115 is associated with a higher level of security (i.e., whether user 110 has upgraded device 115 to a higher level of security). If device 115 is not associated with a higher level of security, router module 140 may access the record stored in memory 135 to determine whether connection request 150 arrived within the grace period initially offered by router module 140. If connection request 150 did in fact arrive within the grace period, router module 140 may route connection request 150 to third adapter interface 145C (i.e., the adapter interface assigned to the lowest levels of security). If connection request 150 did not arrive within the grade period, router module 140 may reject connection request 150, without sending it to any of adapter interfaces 145A through 145C.

In addition to providing those devices 115 that are associated with security levels lower than the lowest level of security assigned to any of adapter interfaces 145A through 145C with grace periods, during which time router module 140 may permit such devices to connect to servers 125, this disclosure contemplates that in certain embodiments, router module 140 may offer grace periods to any devices 115 associated with levels of security lower than the levels of security assigned to first adapter interface 145A (i.e., the highest levels of security). In such embodiments, router module 140 may route a connection request 150 received from one such device 115A to the adapter interface assigned to the level of security immediately higher than the level of security actually associated with device 115. For example, router module 140 may determine that device 115A is associated with a medium level of security. Accordingly, router module 140 may provide device 115A with a grace period, during which time router module 140 may route any connection requests 150 received from device 115A to first adapter interface 145A, assigned to the highest levels of security, rather than to second adapter interface 145B, assigned to medium levels of security. This may be desirable to provide users 110 with time during which to upgrade their devices 115, in response to security upgrades to servers 125. For example, device 115A may initially be associated with a high level of security. After a system administrator upgrades the security standards of servers 125, however, router module 140 may no longer consider the security standards offered by device 115A to be high; instead, after the upgrade to servers 125, router module 140 may associate the security standards offered by device 115A with a medium level of security. Therefore, rather than immediately preventing user 110A from accessing certain locations within servers 125 to which the user previously had access (i.e. locations within first zone 125A, of first adapter interface 145A, but not within second zone 125B of second adapter interface 145B), router module 140 may instead request that user 110A upgrade his/her device 115A to higher security standards, but nevertheless permit user 110A to continue to access the locations in servers 125 associated with first adapter interface 145A in the meantime (provided user 110A upgrades device 115A within the grace period).

Router module 140 may be a software module stored in memory 135 and executed by processor 130. An example algorithm for router module 140 is as follows: receive connection request 150; set a "current standards" variable equal to the highest available security standards; attempt to connect to the device 115 that submitted connection request 150 using the highest available security standards; if the connection attempt with the highest security standards fails: {set a connection flag equal to zero; while the connection flag is equal to zero: {set the current standards variable equal to the next highest standards; attempt to connect to device 115 using these next highest security standards; if the connection attempt with these next highest security standards is successful: set the value of the connection flag to 1}}}; locate the security standards stored in the current standards variable in a table stored in memory 135; identify from the table the adapter interface of adapter interfaces 145A through 145C to which the located security standards are assigned; send connection request 150 to the identified adapter interface.

Adapter interfaces 145A through 145C perform the actual handshakes between devices 115 and servers 125, thereby establishing the connections between devices 115 and servers 125. While FIG. 1 illustrates the use of three adapter interfaces 145A through 145C, this disclosure contemplates that security tool 105 may include any number of adapter interfaces, with each adapter interface assigned to a different level of security.

As illustrated in FIG. 1, first adapter interface 145A is assigned to a first level of security, second adapter interface 145B is assigned to a second level of security, lower than the first level of security, and third adapter interface 145C is assigned to a third level of security, lower than the second level of security. Accordingly, first adapter interface 145A receives from router module 140 connection requests 150 submitted by device 115A and associated with the highest levels of security, second adapter interface 145B receives from router module 140 connection requests 150 submitted by device 115B and associated with medium levels of security, and third adapter interface 145C receives from router module 140 connection requests 150 submitted by device 115C and associated with the lowest levels of security. Each of adapter interfaces 145A through 145C is also assigned to a given zone of locations in servers 125. For example, as illustrated in FIG. 1, first adapter interface 145A is assigned to first zone 125A, second adapter interface 145B is assigned to second zone 125B, and third adapter interface 145C is assigned to third zone 125C. In certain embodiments, third zone 125C may be a quarantine location. In certain embodiments, rather than being assigned to a separate set of locations from first adapter interface 145A and second adapter interface 145B, third zone 125C may include a subset of locations of second zone 125B.

Once a given adapter interface of adapter interfaces 145A through 145C receives a connection request 150 from router module 140, the adapter interface may establish a connection between the device 115 that submitted request 150 and servers 125, to provide the device 115 with access to a zone 125A through 125C of servers 125 assigned to the given adapter interface. For example, when first adapter interface 145A receives a connection request 150 from device 115A, first adapter interface 145A may establish a connection between device 115A and servers 125, providing device 115A with access to first zone 125A. Similarly, when second adapter interface 145B receives a connection request 150 from device 115B, second adapter interface 145B may establish a connection between device 115B and servers 125, providing device 115B with access to second zone 125B. Additionally, when third adapter interface 145C receives a connection request 150 from device 115C, third adapter interface 145C may establish a connection between device 115C and servers 125, providing device 115C with access third zone 125C. This disclosure contemplates that adapter interfaces 145A through 145C may establish connections between devices 115 and servers 125 by performing handshakes between devices 115 and servers 125, using the security standards of devices 115 determined by router module 140.

Once an adapter interface of adapter interfaces 145A through 145C has established a connection between a device 115 and servers 125, device 115 may be permitted to both access data stored in servers 125 and send data to servers 125. In order to provide further security protections to servers 125, this disclosure contemplates that each adapter interface of adapter interfaces 145A through 145C may apply security measures to data 160 submitted by devices 115 prior to allowing the data to enter servers 125. In certain embodiments, the security measures may include virus scans, malware scans, and/or data integrity checks. This disclosure contemplates that the type and/or degree of the security measures applied to data 160 may depend on the security standards of the device 115 which transmitted data 160. For example, first adapter interface 145A may be associated with a first level of security scanning, second adapter interface 145B may be associated with a second level of security scanning, higher than the first level of security scanning, and third adapter interface 145C may be associated with a third level of security scanning, higher than both the first level and the second level of security scanning. As an example, in certain embodiments, the first level of security scanning may include scanning the first 10,000 records of data 160 for viruses and/or malware, second level of security scanning may include scanning the first 50,000 records of data 160 for viruses and/or malware, while third level of security scanning may include scanning all of data 160 for viruses and/or malware. Additionally, this disclosure contemplates that in embodiments in which third zone 125C corresponds to a quarantine location, the servers in first zone 125A may perform additional security scanning on data 160 after it has been stored in quarantine 125C. For example, the servers in first zone 125A may be configured to perform additional scanning on data 160, stored in quarantine 125C, after which the servers in first zone 125A may extract data 160 from third zone 125C and store it in first zone 125A, provided that no viruses, malware, or other security threats were detected within the data 160.

Adapter interfaces 145A through 145C may be software modules stored in memory 135 and executed by processor 130. An example algorithm for first adapter interface 145A is as follows: receive connection request 150 from router module 140; establish a connection between first device 115A and servers 125; if first device 115A attempts to access any server locations in first zone 125A: permit first device 115A to access the locations in first zone 125A; if first device 115A attempts to access any server locations outside first zone 125A, prevent first device 115A from accessing the server locations outside of first zone 125A; determine whether first device 115A is sending data 160 to servers 125: if first device 115A is sending data 160 to servers 125: {determine whether first device 115A is sending data 160 to server locations in first zone 125A; if first device 115A is sending data 160 to locations in first zone 125A: {receive data 160 submitted from device 115A; for each of the first 10,000 records of data 160: perform virus and malware scanning; if no security threats are detected, allow data 160 to travel to the locations in first zone 125A; if security threats are detected, prevent data 160 from reaching servers 125}; if first device 115A is sending data 160 to locations outside of first zone 125A: discard data 160}.

An example algorithm for second adapter interface 145B is as follows: receive connection request 150 from router module 140; establish a connection between second device 115B and servers 125; if second device 115B attempts to access any server locations in second zone 125B: permit second device 115B to access the locations in second zone 125B; if second device 115B attempts to access any server locations outside of second zone 125B, prevent second device 115B from accessing the server locations outside of second zone 125B; determine whether second device 115B is sending data 160 to servers 125; if second device 115B is sending data 160 to servers 125: {determine whether second device 115B is sending data 160 to server locations in second zone 125B; if second device 115B is sending data 160 to locations in second zone 125B: {receive data 160 submitted from device 115B; for each of the first 50,000 records of data 160: perform virus and malware scanning; if no security threats are detected, allow data 160 to travel to the locations in second zone 125B; if security threats are detected, prevent data 160 from reaching servers 125}; if second device 115B is sending data 160 to locations outside of second zone 125B: discard data 160}.

An example algorithm for third adapter interface 145A is as follows: receive connection request 150 from router module 140; establish a connection between third device 115C and servers 125; if third device 115C attempts to access any server locations in third zone 125C: permit third device 115C to access the locations in third zone 125C; if third device 115C attempts to access any server locations outside of third zone 125C, prevent third device 115C from accessing the server locations outside of second zone 125C; determine whether second device 115C is sending data 160 to servers 125; if second device 115C is sending data 160 to servers 125: {determine whether second device 115C is sending data 160 to server locations in third zone 125C; if third device 115C is sending data 160 to locations in third zone 125C: {receive data 160 submitted from device 115C; for each record of data 160: perform virus and malware scanning; if no security threats are detected, allow data 160 to travel to third zone 125C; if security threats are detected, prevent data 160 from reaching servers 125}; if third device 115C is sending data 160 to locations outside of third zone 125C: discard data 160}.

Processor 130 is any electronic circuitry, including, but not limited to microprocessors, application specific integrated circuits (ASIC), application specific instruction set processor (ASIP), and/or state machines, that communicatively couples to memory 135 and controls the operation of security tool 105. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of security tool 105 by processing information received from network 120A, network 120B, device(s) 115, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

In certain embodiments, security tool 105 may help to protect internal servers 125 from security threats arising from the use of devices 115, which may not be upgraded with up-to-date security standards, to access servers 125. By using router module 140 to determine the security standards associated with a given device 115A, before the device is allowed to access servers 125, security tool 105 may limit the exposure of servers 125 to potential security threats. Additionally, by providing different devices 115 with different levels of access to servers 125 depending on the security standards associated with the devices, certain embodiments may help to ensure that users 110 have continued access to servers 125 (despite failing to upgrade their devices 115 to the highest security standards), while nevertheless protecting servers 125, by limiting the access of lower security standard devices to sensitive data in servers 125.

FIGS. 2A through 2D present examples illustrating the operation of security tool 105 in response to receiving connection requests 150 from devices 115 of varying levels of security. FIG. 2A illustrates the operation of security tool 105 in response to receiving a connection request 150A from a device 115A associated with a high level of security. Security tool 105 uses router module 140 to intercept connection request 150A before connection request 150A reaches servers 125. Router module 140 then determines the security standards associated with request 150A, which, in this example, are high. Router module 140 then sends connection request 150A to first adapter interface 145A, assigned to the highest levels of security. First adapter interface 145A then establishes a connection between device 115A and servers 125, by performing a handshake between device 115A and servers 125. This connection provides device 115A with access to first zone 125A of servers 125. Once the connection has been established between device 115A and servers 125, user 110A may submit data 160A to first zone 125A over the connection. Data 160A arrives first at first adapter interface 145A. First adapter interface 145A performs a first level of security scanning on data 160A. In certain embodiments, such scanning may include virus scanning, malware scanning, and/or data integrity scanning. This disclosure contemplates that the first level of security scanning is a relatively light level of security scanning. For example, first adapter interface 145A may scan the first 10,000 records of data 160A. If no security threats are identified during this scan, first adapter interface 145A may permit data 160A to be received by first zone 125A.

FIG. 2B illustrates the operation of security tool 105 in response to receiving a connection request 150B from a device 115B associated with a medium level of security. Security tool 105 uses router module 140 to intercept connection request 150B before connection request 150B reaches servers 125. Router module 140 then determines the security standards associated with request 150B, which, in this example, are moderate. In certain embodiments, given that device 115B is not associated with the highest levels of security, router module 140 may send a report 155B to device 115B requesting that user 110B upgrade the security standards of device 115B. In certain embodiments, report 155 may contain download links for higher-level security standards and/or instructions on how to download higher-level security standards. Router module 140 then sends connection request 150B to second adapter interface 145B, assigned to medium levels of security. Second adapter interface 145B then establishes a connection between device 115B and servers 125, by performing a handshake between device 115B and servers 125. This connection provides device 115B with access to second zone 125B of servers 125. Once the connection has been established between device 115B and second zone 125B, user 110B may submit data 160B to second zone 125B over the connection. Data 160B arrives first at second adapter interface 145B. Second adapter interface 145B then performs a second level of security scanning on data 160B. This disclosure contemplates that the second level of security scanning is more intensive than the first level of security scanning. For example, second adapter interface 145B may scan the first 50,000 records of data 160B. If no security threats are identified during this scan, second adapter interface 145B may permit data 160B to be received by second zone 125B.

FIG. 2C illustrates an example of the operation of security tool 105 in response to receiving a connection request 150C from a device 115C associated with a low level of security. Security tool 105 uses router module 140 to intercept connection request 150C before connection request 150C reaches servers 125. Router module 140 then determines the security standards associated with request 150C, which, in this example, are low. In certain embodiments, given that device 115C is not associated with the highest levels of security, router module 140 may send a report 155C to device 115C requesting that user 110C upgrade the security standards of device 115C. In certain embodiments, report 155 may contain download links for higher-level security standards and/or instructions on how to download higher-level security standards. Router module 140 then sends connection request 150C to third adapter interface 145C, assigned to the lowest levels of security. Third adapter interface 145C then establishes a connection between device 115C and servers 125, by performing a handshake between device 115C and servers 125. This connection provides device 115C with access to third zone 125C. In certain embodiments, third zone 125C may correspond to a quarantine location. Once the connection has been established between device 115C and third zone 125C, user 110C may submit data 160C to third zone 125C over the connection. Data 160C arrives first at third adapter interface 145C. Third adapter interface 145C then performs a third level of security scanning on data 160C. This disclosure contemplates that the third level of security scanning is more intensive than both the first level of security scanning and the second level of scanning. For example, third adapter interface 145C may scan every record of data 160C. If no security threats are identified during this scan, third adapter interface 145C may permit data 160C to be received by third zone 125C. In certain embodiments in which third zone 125C corresponds to a quarantine location, servers in first zone 125A may perform additional security scanning on data 160C once it has been stored in quarantine 125C.

FIG. 2D illustrates an example of the operation of security tool 105 in response to receiving a connection request 150D from a device 115D associated with legacy security standards. Security tool 105 uses router module 140 to intercept connection request 150D before connection request 150D reaches servers 125. Router module 140 then determines the security standards associated with request 150D, which, as described above, are legacy standards. In certain embodiments, router module 140 may send a report 155D to device 115D requesting that user 110D upgrade the security standards of device 115D. In certain embodiments, report 155 may contain download links for higher-level security standards and/or instructions on how to download higher-level security standards. In certain embodiments, and as illustrated in FIG. 2D, in response to determining that device 115D is associated with legacy security standards, rather than sending connection request 150D to any of adapter interfaces 145A through 145C, router module 140 sends denial 205, rejecting connection request 150D. In certain other embodiments, and as described above in the discussion of FIG. 1, router module may provide device 115D with a grace period during which time router module 140 may send connection requests 150D to third adapter interface 145C, to establish a connection between device 115D and quarantine 125C. In certain such embodiments, report 155D may include an indication that device 115D may be permitted to connect to third zone 125C during this grace period, but if user 110D does not upgrade the security standards of device 115D before the grace period expires, connection requests 150D received after the expiry of the grace period will be denied.

FIG. 3 presents a flow chart illustrating the operation of security tool 105 in response to connection requests 150 from devices 115 associated with various levels of security. In step 305, security tool 105 receives connection request 150 from a device 115, using router module 140. In step 310, security tool 105 uses router module 140 to determine the security level associated with device 115, without yet providing device 115 with access to servers 125. In step 315, security tool 105 determines if the security level associated with device 115 is high. If security tool 105 determines that the security level is high, then in step 330, security tool 105 uses router module 140 to send connection request 150 to first adapter interface 145A. First adapter interface 145A may then establish a connection between device 115 and first zone 125A. In step 335, security tool 105 receives data 160 from device 115. In step 340, security tool 105 applies the lowest level of security scanning to data 160. Finally, in step 345, security tool 105 stores data 160 in first zone 125A, provided that no security threats were detected in data 160 during the security scanning process.

If, in step 315, security tool 105 determined that the security level associated with device 115 was not high, security tool 105 next determines, in step 320, whether the security level associated with device 115 is medium. If security tool 105 determines that the security level is medium, then in step 350, security tool 105 generates report 155 requesting that user 110 upgrade the security standards of device 115. In step 355, security tool 105 uses router module 140 to send connection request 150 to second adapter interface 145B. Second adapter interface 145B may then establish a connection between device 115 and second zone 125B. In step 360, security tool 105 receives data 160 from device 115. In step 365, security tool 105 applies a moderate level of security scanning to data 160. Finally, in step 370, security tool 105 stores data 160 in second zone 125B, provided that no security threats were detected in data 160 during the security scanning process.

If, in step 320, security tool 105 determined that the security level associated with device 115 was not medium, security tool 105 next determines, in step 325, whether the security level associated with device 115 is low. If security tool 105 determines that the security level is low, then in step 375, security tool 105 generates report 155 requesting that user 110 upgrade the security standards of device 115. In step 380, security tool 105 uses router module 140 to send connection request 150 to third adapter interface 145C. Third adapter interface 145C may then establish a connection between device 115 and quarantine (third zone) 125C. In step 385, security tool 105 receives data 160 from device 115. In step 390, security tool 105 applies a high level of security scanning to data 160. Finally, in step 390, security tool 105 stores data 160 in quarantine (third zone) 125C, provided that no security threats were detected in data 160 during the security scanning process.

Modifications, additions, or omissions may be made to method 300 depicted in FIG. 3. Method 300 may include more, fewer, or other steps. For example, steps may be performed in parallel or in any suitable order. While discussed as security tool 105 (or components thereof) performing the steps, any suitable component of system 100, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system, comprising:
a router module configured to:
receive a first request comprising first security metadata, the first request indicating that a first device is seeking a first connection with one or more servers;
determine, based at least in part upon the first security metadata, that the first device is associated with a first level of security;
in response to determining that the first device is associated with the first level of security, send the first request to a first adapter interface;
receive a second request comprising second security metadata, the second request indicating that a second device is seeking a second connection with the one or more servers;
determine, based at least in part upon the second security metadata, that the second device is associated with a second level of security lower than the first level of security;
in response to determining that the second device is associated with the second level of security send the second request to a second adapter interface; and
the first adapter interface assigned to the first level of security, the first adapter interface configured to:
receive the first request from the router module;
establish the first connection between the first device and the one or more servers, the first connection providing the first device with access to a first zone of the one or more servers, the first zone comprising a first set of resources assigned to the first level of security;
receive first data from the first device; and
apply first security measures to the first data;
the second adapter interface assigned to the second level of security, the second adapter interface configured to:
receive the second request from the router module;
establish the second connection between the second device and the one or more servers, the second connection providing the second device with access to a second zone of the one or more servers, the second zone excluding the first set of resources and comprising a second set of resources assigned to the second level of security;
receive second data from the second device; and
apply second security measures to the second data, the second security measures stronger than the first security measures; and
a hardware processor configured to implement the first adapter interface, the second adapter interface, and the router module.

2. The system of claim 1, wherein:
applying the first security measures to the first data comprises applying a scan to a first portion of the first data; and
applying the second security measures to the second data comprises applying the scan to a second portion of the second data, the second portion greater than the first portion.

3. The system of claim 2, wherein the scan comprises at least one of a virus scan, a malware scan, and a data integrity check.

4. The system of claim 1, further comprising a memory comprising a set of security parameters, wherein determining that the second device is associated with the second level of security comprises comparing the second security metadata to the set of security parameters.

5. The system of claim 1, wherein the router module is further configured to:
in response to determining that the second device is associated with the second level of security:
generate a first report requesting that the second device perform a first upgrade from the second level of security to the first level of security; and
send the first report to the second device.

6. The system of claim 1, wherein the router module is further configured to:
receive an additional request comprising additional security metadata, the additional request indicating that an additional device is seeking an additional connection with the one or more servers;
determine, based at least in part upon the additional security metadata, that the additional device is associated with an additional level of security lower than the second level of security;
in response to determining that the additional device is associated with the additional level of security lower than the second level of security:
generate a report requesting that the additional device perform an upgrade from the additional level of security to at least one of the first level of security and the second level of security;
send the report to the additional device; and
discard the additional request.

7. A method comprising:
receiving, using a router module, a first request comprising first security metadata, the first request indicating that a first device is seeking a first connection with one or more servers;
determining, based at least in part upon the first security metadata, that the first device is associated with a first level of security;
in response to determining that the first device is associated with the first level of security, sending the first request to a first adapter interface assigned to a first level of security;
receiving, using the first adapter interface, the first request;
establishing, using the first adapter interface, the first connection between the first device and the one or more servers, the first connection providing the first device with access to a first zone of the one or more servers, the first zone comprising a first set of resources assigned to the first level of security;
receiving, using the first adapter interface, first data from the first device;
applying, using the first adapter interface, first security measures to the first data;
receiving, using the router module, a second request comprising second security metadata, the second request indicating that a second device is seeking a second connection with the one or more servers;
determining, based at least in part upon the second security metadata, that the second device is associated with a second level of security lower than the first level of security;
in response to determining that the second device is associated with the second level of security, sending the second request to a second adapter interface assigned to the second level of security;
receiving, using the second adapter interface, the second request;
establishing, using the second adapter interface, the second connection between the second device and the one or more servers, the second connection providing the second device with access to a second zone of the one or more servers, the second zone excluding the first set of resources and comprising a second set of resources assigned to the second level of security; and
receiving, using the second adapter interface, second data from the second device;
applying, using the second adapter interface, second security measures to the second data, the second security measures stronger than the first security measures.

8. The method of claim 7, wherein:
applying the first security measures to the first data comprises applying a scan to a first portion of the first data; and
applying the second security measures to the second data comprises applying the scan to a second portion of the second data, the second portion greater than the first portion.

9. The method of claim 8, wherein the scan comprises at least one of a virus scan, a malware scan, and a data integrity check.

10. The method of claim 7, wherein determining that the second device is associated with the second level of security comprises comparing the second security metadata to a set of security parameters stored in a memory.

11. The method of claim 7, further comprising:
in response to determining that the second device is associated with the second level of security:
- generating a first report requesting that the second device perform a first upgrade from the second level of security to the first level of security; and
- sending the first report to the second device.

12. The method of claim 7, further comprising:
receiving, using the router module, an additional request comprising additional security metadata, the additional request indicating that an additional device is seeking an additional connection with the one or more servers;
determining, using the router module, based at least in part upon the additional security metadata, that the additional device is associated with an additional level of security lower than the second level of security;
in response to determining that the additional device is associated with the additional level of security:
- generating a report requesting that the additional device perform an upgrade from the additional level of security to at least one of the first level of security and the second level of security;
- sending the report to the additional device; and
- discarding the additional request.

13. A system comprising:
one or more servers;
a router module configured to:
- receive a first request comprising first security metadata, the first request indicating that a first device is seeking a first connection with the one or more servers;
- determine, based at least in part upon the first security metadata, that the first device is associated with a first level of security;
- in response to determining that the first device is associated with the first level of security, send the first request to a first adapter interface, the first adapter interface;
- receive a second request comprising second security metadata, the second request indicating that a second device is seeking a second connection with the one or more servers;
- determine, based at least in part upon the second security metadata, that the second device is associated with a second level of security lower than the first level of security; and
- in response to determining that the second device is associated with the second level of security send the second request to a second adapter interface; and the first adapter interface assigned to the first level of security, the first adapter interface configured to:
- receive the first request from the router module;
- establish the first connection between the first device and the one or more servers, the first connection providing the first device with access to a first zone of the one or more servers, the first zone comprising a first set of resources assigned to the first level of security;
- receive first data from the first device; and
- apply first security measures to the first data, wherein applying the first security measures to the first data comprises applying a scan to a first portion of the first data; and the second adapter interface assigned to the second level of security, the second adapter interface configured to:
- receive the second request from the router module;
- establish the second connection between the second device and the one or more servers, the second connection providing the second device with access to a second zone of the one or more servers, the second zone excluding the first set of resources and comprising a second set of resources assigned to the second level of security;
- receive second data from the second device; and
- apply second security measures to the second data, the second security measures stronger than the first security measures, wherein applying the second security measures to the second data comprises applying the scan to a second portion of the second data, the second portion greater than the first portion.

14. The system of claim 13, wherein the scan comprises at least one of a virus scan, a malware scan, and a data integrity check.

15. The system of claim 13, further comprising a storage element configured to store a set of security parameters, wherein determining that the second device is associated with the second level of security comprises comparing the second security metadata to the set of security parameters.

16. The system of claim 13, wherein the router module is further configured to:
in response to determining that the second device is associated with the second level of security:
- generate a first report requesting that the second device perform a first upgrade from the second level of security to the first level of security; and
- send the first report to the second device.

17. The system of claim 13, wherein the router module is further configured to:
- receive an additional request comprising additional security metadata, the additional request indicating that an additional device is seeking an additional connection with the one or more servers;
- determine, based at least in part upon the additional security metadata, that the additional device is associated with an additional level of security lower than the second level of security;
- in response to determining that the additional device is associated with the additional level of security:
  - generate a report requesting that the additional device perform an upgrade from the additional level of security to at least one of the first level of security and the second level of security;
  - send the report to the additional device; and
  - discard the additional request.

* * * * *